United States Patent [19]
Tanaka et al.

[11] Patent Number: 6,075,565
[45] Date of Patent: Jun. 13, 2000

[54] SOLID-STATE IMAGE SENSING APPARATUS AND ITS DRIVING METHOD

[75] Inventors: Hiroaki Tanaka; Tomio Ishigami, both of Kanagawa, Japan

[73] Assignee: Sony Corporation, Japan

[21] Appl. No.: 08/879,413

[22] Filed: Jun. 20, 1997

[30] Foreign Application Priority Data

Jun. 24, 1996 [JP] Japan .................................... 8-162959

[51] Int. Cl.[7] .............................. H04N 3/14; H04N 5/335
[52] U.S. Cl. .......................... 348/312; 348/315; 348/317; 348/322; 257/232
[58] Field of Search ......................... 250/208.1; 257/232, 257/245, 249; 348/222, 229, 230, 294, 311, 312, 315, 316, 317, 319–324; H04N 3/14, 5/335

[56] References Cited

U.S. PATENT DOCUMENTS

| | | | |
|---|---|---|---|
| 4,963,980 | 10/1990 | Suga | 348/317 |
| 5,051,832 | 9/1991 | Losee | 348/317 |
| 5,796,432 | 8/1998 | Iesaka | 348/311 |
| 5,828,407 | 10/1998 | Suzuki | 348/312 |
| 5,847,758 | 12/1998 | Iizuka | 348/317 |
| 5,867,212 | 2/1999 | Toma | 348/311 |
| 5,926,215 | 7/1999 | Whipple | 348/322 |

*Primary Examiner*—Tuan Ho
*Assistant Examiner*—Ngoc-Yen Vu
*Attorney, Agent, or Firm*—Rader, Fishman & Grauer; Ronald P. Kananen

[57] ABSTRACT

An electronic still camera requires a solid-state image sensing apparatus capable of providing a higher-speed pickup image signal having a high vertical resolution. In a line reducing operation to reduce the number of lines of the pickup image signal to be output by applying read-out pulses to read-out gate units located at predetermined intervals in order to read out only signal electric charge from sensor units for picture elements arranged in the vertical direction on some lines, a vertical CCD is driven by a combination of a pair of vertical transfer clock signals øV1 (øV1') and øV3 (øV3') having phases opposite to each other and another pair of vertical transfer clock signals øV2 and øV4 also having phases opposite to each other, allowing the overlap period twice the vertical transfer clock signals to be lengthened.

4 Claims, 12 Drawing Sheets

VERTICAL TRANSFER CLOCK SIGNALS IN A
FRAME READ-OUT OPERATING MODE

VERTICAL TRANSFER CLOCK SIGNALS IN A
LINE THINNING OPERATING MODE

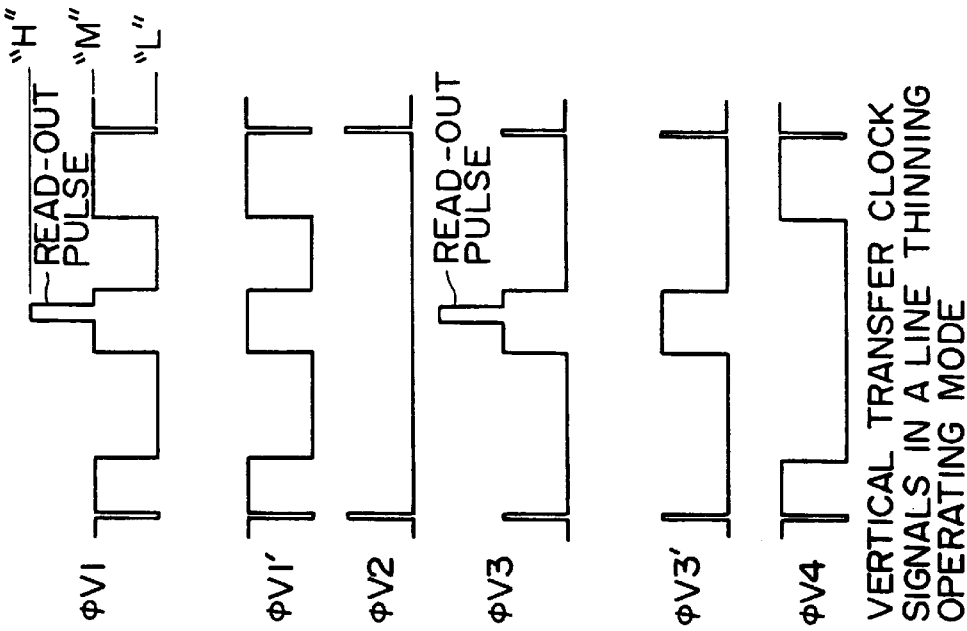
FIG. 6A  Vertical transfer clock signals in a frame read-out operating mode
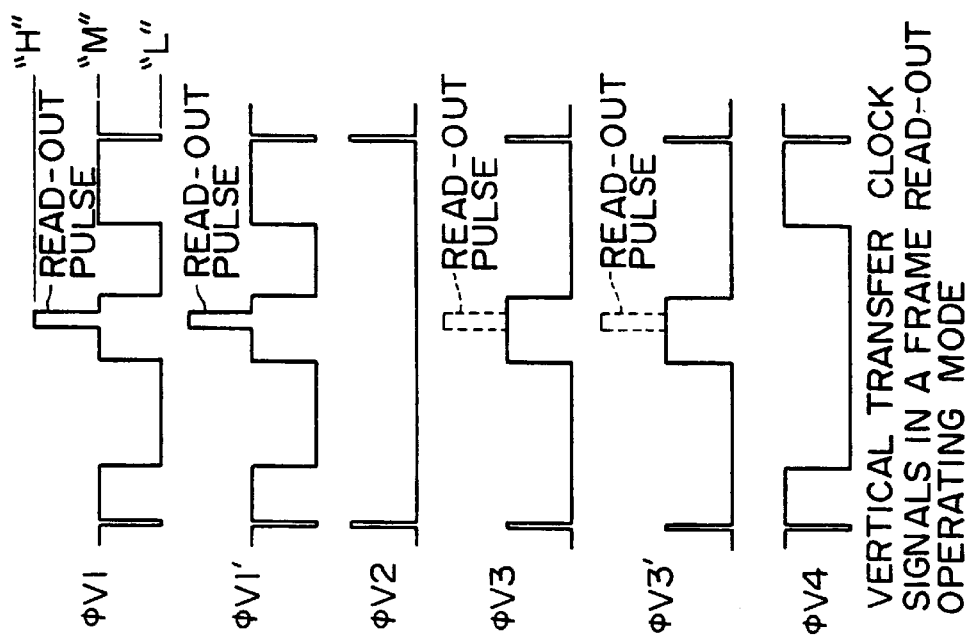
FIG. 6B  Vertical transfer clock signals in a line thinning operating mode

ELECTRIC CHARGE TRANSFER DIRECTION

ODD FIELD        EVEN FIELD

ODD FIELD          EVEN FIELD

SOLID-STATE IMAGE SENSING APPARATUS AND ITS DRIVING METHOD

BACKGROUND OF THE INVENTION

In general, the present invention relates to a solid-state image sensing apparatus and its driving method. In particular, the present invention relates to a solid-state image sensing apparatus suitable for use in equipment such as an electronic still camera, and a driving method of the solid-state image sensing apparatus.

In a conventional solid-state image sensing apparatus like, for example, a CCD (Charge Couple Device) solid-state image sensing apparatus employed in an apparatus such as a video camera, electric charge is accumulated in each sensor unit 101 for 1/60 seconds, a period of time corresponding to one field, and pieces of signal electric charge read-out from two adjacent sensor units 101 representing two adjacent picture elements arranged in the vertical direction are combined in a vertical CCD 102 in order to generate an output signal of an interlace system as shown in FIG. 12. In addition, interlace scanning is implemented by adopting a so called field read-out system whereby two adjacent sensor units 101 are combined for an even field in a way different from that for an odd field as shown by right and left diagrams of the figure.

In the field read-out system, the time for accumulating electric charge in a picture element is 1/60 seconds. In a so-called frame read-out system, on the other hand, signal electric charge of only an even line or signal electric charge of only an odd line is read-out during an accumulation time of 1/30 seconds as shown in FIG. 13. Since the accumulation time of the field read-out system is half that of the frame read-out system, the field read-out system offers a merit that the image of a dynamic picture can be well picked up. Since pieces of signal electric charge of two adjacent picture elements in the vertical direction are mixed, however, the field read-out system has a demerit that the vertical resolution is low. Thus, the field read-out system is not an image pickup system appropriate for an electronic still camera which requires a high resolution.

For the reason described above, an electronic still camera employs a solid-state image sensing apparatus of the frame read-out system which uses a mechanical shutter as an image sensing device. As an alternative, an electronic still camera may employ a solid-state image sensing apparatus of a so-called all pixel read-out system whereby pieces of signal electric charge of picture elements are read-out independently of each other without mixing them in vertical CCDs as shown in FIG. 14. The use of the solid-state image sensing apparatus of these systems allows the vertical resolution to be prevented from deteriorating. However, the time it takes to output a pickup image signal is twice that required by the solid-state image taking apparatus of the field read-out system for the same number of picture elements.

In many cases, an electronic still camera is provided with a monitor for displaying a picked-up image of a picture such as a liquid crystal display monitor. Such a monitor facilities adjustment of the focus and the camera angle at an image pickup time. In general, a liquid crystal display monitor displays a picture at a non-interlace scanning speed of 1/60 seconds. As a result, supplying a pickup image signal of a 1/30 second period to the liquid crystal display monitor as it is will give rise to a problem of a distorted display picture like the one shown in FIG. 16.

In order to avoid the problem described above, a V (video) RAM (frame memory unit) 112 is provided for a liquid crystal display (LCD) monitor 11 as shown in FIG. 17. The frame memory unit 112 is used for converting the frame rate. To put it in detail, in the configuration of a display system employing a VRAM unit 112, a pickup image signal with a period of 1/30 seconds is supplied to the VRAM unit 112 while a non-interlace signal with a period of 1/60 seconds is read-out from the VRAM unit 112 to be fed to the LCD monitor 111.

Having a high vertical resolution as described above, a solid-state image sensing apparatus of the all-pixel read-out system is suitable for use in an electronic still camera as an image sensing device. On the other hand, since a VRAM unit or a frame memory unit is required for displaying a taken image of a picture on an ordinary television monitor, there is raised a problem that the cost of an electronic still camera rises. In addition, since an electronic still camera employs automatic control apparatuses such as an automatic focus control apparatus, an automatic iris control apparatus and an automatic white balance control apparatus, there is also raised a problem that the responses of these automatic control apparatuses are made slower by a long period of a signal output by the image pickup device.

As a way to solve the problems described above, a technique of increasing the data rate of a signal output by the image sensing device can be thought of. In order to increase the data rate of a signal output by the image sensing device, however, it is necessary to provide a sampling rate converter. In addition, as the clock frequency is increased, there are also raised new problems such as an increase in power consumption, higher costs of components in use and deterioration of the S/N ratio. Thus, the technique of increasing the data rate of a signal output by the image sensing device can not be said to be a good solution.

SUMMARY OF THE INVENTION

The present invention addresses the problems described above. It is thus an object of the present invention to provide a solid-state image sensing apparatus capable of providing a higher-speed pickup image signal in a simple configuration, which is obtained as a result of simply modifying the configuration of a driving system, and a driving method of the solid-state image sensing apparatus.

In order to achieve the object described above, the present invention provides a solid-state image sensing apparatus comprising:

a solid-state image sensing device including:
  a plurality of sensor units arranged to form a matrix each for converting light into signal electric charge;
  a plurality of read-out gate units each associated with one of said sensor units for reading out said signal electric charge resulting from conversion of said light from said associated sensor unit;
  vertical transfer units each for transferring said signal electric charge read out by said read-out gate units in a vertical direction; and
  a horizontal transfer unit for transferring said signal electric charge transferred by said vertical transfer unit in a horizontal direction, and
a driving system which is used for:
  reading out signal electric charge only from some of said sensor units arranged in a vertical direction in a state with a filled packet containing signal electric charge coexisting in said vertical transfer unit with empty packets each with no electric charge following said filled packet in a transfer direction by applying read-out pulses to some of said read-out gate units located at predetermined intervals; and driving each of said vertical transfer units by combining pairs of vertical transfer clock signals having phases opposite to each other and mixing information of said filled packet containing signal electric charge with information of at least one of said empty packets following said filled packet in said vertical transfer unit into mixed information in said horizontal transfer unit.

The present invention further provides a driving method to be adopted in a solid-state image sensing apparatus having a solid-state image sensing device comprising:

A plurality of sensor units arranged to form a matrix for each converting a light into signal electric charge;

a plurality of read-out gate units each associated with one of said sensor units for reading out said signal electric charge resulting from conversion of said light from said associated sensor unit;

vertical transfer units each for transferring said signal electric charge read out by said read-out gate units in a vertical direction; and a horizontal transfer unit for transferring said signal electric charge transferred by said vertical transfer unit in a horizontal direction, said driving method comprising the steps of:

reading out signal electric charge only from some of said sensor units arranged in a vertical direction in a state with a filled packet containing signal electric charge coexisting in said vertical transfer unit with empty packets each with no electric charge following said filled packet in a transfer direction by applying read-out pulses to some of said read-out gate units located at predetermined intervals; and driving each of said vertical transfer units by combining pairs of vertical transfer clock signals having phases opposite to each other and mixing information of said filled packet containing signal electric charge with information of at least one of said empty packets following said filled packet in said vertical transfer unit into mixed information in said horizontal transfer unit.

The present invention still further provides a camera comprising:

a solid-state image sensing apparatus including:

a plurality of sensor units arranged to form a matrix each for converting light into signal electric charge;

a plurality of read-out gate units each associated with one of said sensor units for reading out said signal electric charge resulting from conversion of said light from said associated sensor unit;

vertical transfer units each for transferring said signal electric charge read out by said read-out gate units in a vertical direction; and a horizontal transfer unit for transferring said signal electric charge transferred by said vertical transfer unit in a horizontal direction, a driving system which is used for:

reading out signal electric charge only from some of said sensor units arranged in a vertical direction in a state with a filled packet containing signal electric charge coexisting in said vertical transfer unit with empty packets each with no electric charge following said filled packet in a transfer direction by applying read-out pulses to some of said read-out gate units located at predetermined intervals; and driving each of said vertical transfer units by combining pairs of vertical transfer clock signals having phases opposite to each other and mixing information of said filled packet containing signal electric charge with information of at least one of said empty packets following said filled packet in said vertical transfer unit into mixed information in said horizontal transfer unit; and an optical system for leading an incident light to an image taking area of said solid-state image sensing apparatus.

In the solid-state image sensing apparatus and its driving method with configurations described above, by applying read-out pulses to some of the read-out gate units located at predetermined intervals, signal electric charge is read out only from some of the sensor units arranged in a vertical direction. Thus, only signal electric charge of picture elements of specific lines is read out. As a result, a filled packet containing signal electric charge coexists in the vertical transfer unit with empty packets each with no electric charge following the filled packet in a transfer direction. The, by driving each of the vertical transfer units by a combination of pairs of vertical transfer clock signals having phases opposite to each other, signal electric charge is transferred in a vertical direction in a state with an overlap period of the vertical transfer clock signals lengthened, and information of the filled packet containing signal electric charge is mixed with information of at least one of the empty packets following the filled packet in the vertical transfer unit. As a result, the number of lines of the taken-image signal to be output can be reduced, allowing a higher-speed pickup image signal to be obtained.

BRIEF DESCRIPTION OF THE DRAWINGS

An embodiment of the present invention will be explained with reference to the following figures some of which show the embodiment wherein:

FIGS. 6A and 6B are diagrams each showing the waveforms of read-out pulses;

DETAILED DESCRIPTION OF THE PREFERRED EMBODIMENT

The present invention will become more apparent from a study of the following detailed description of a preferred embodiment with reference to the accompanying diagrams some of which show the embodiment. It should be noted that, the description of the present embodiment exemplifies a case in which the present invention is applied to a CCD solid-state image sensing device 10 of an interline transfer (IT) system.

Figure 1:
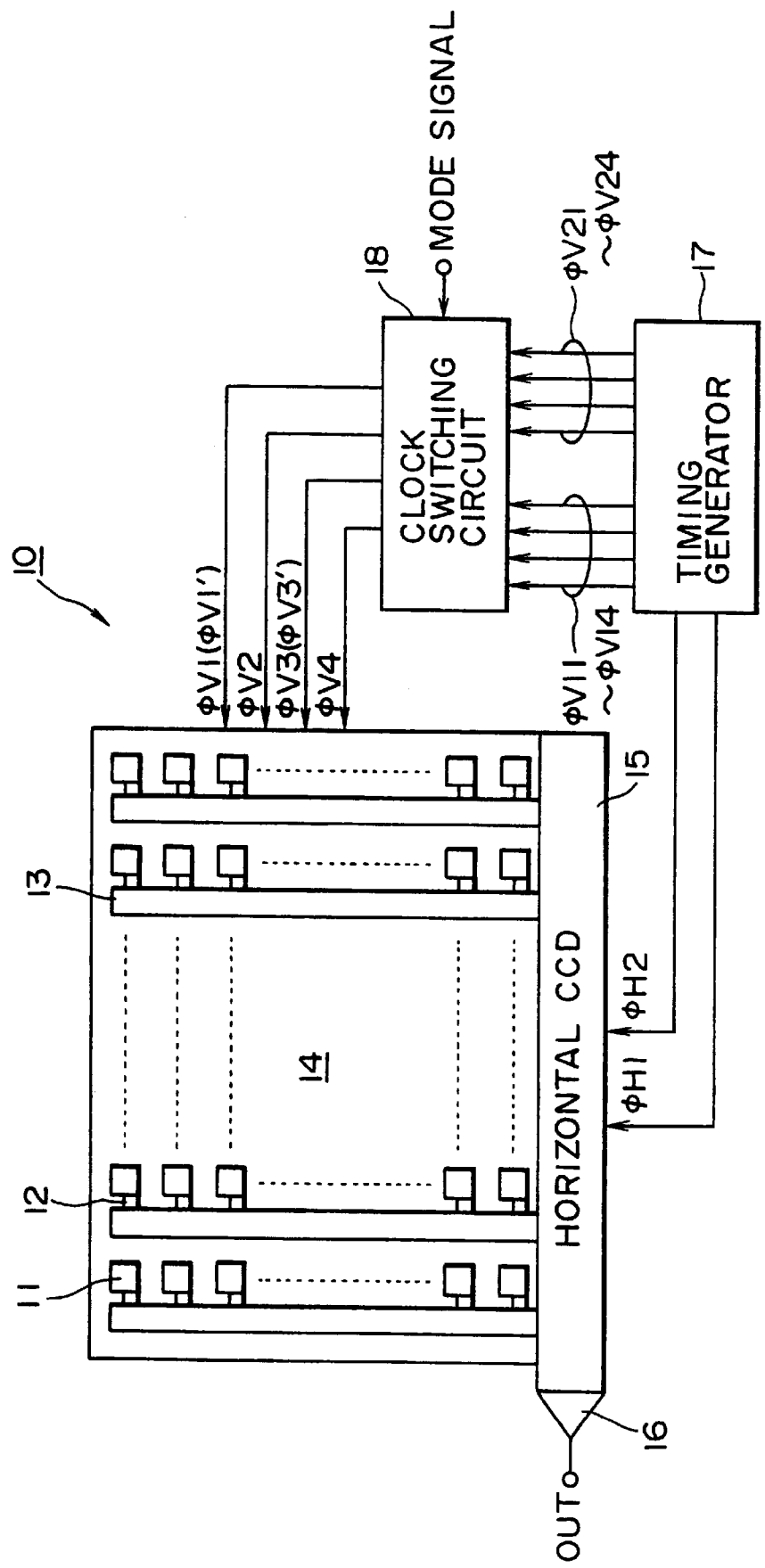
FIG. 1 is a diagram showing a configuration of the embodiment provided by the present invention.

FIG. 1 is a diagram showing a configuration of the embodiment provided by the present invention. As shown in the figure, the CCD solid-state image sensing device 10 implemented by the embodiment comprises a plurality of sensor units 11 each for converting incident light into signal electric charge with an electric charge amount representing the quantity of the incident light and for accumulating the signal electric charge. The sensor units 11 are arranged in a row (horizontal) direction and a column (vertical) direction to form a matrix. There are provided a plurality of read-out gate units 12 each associated with one of the sensor units 11. There are also provided a plurality of vertical CCDs 13 each for transferring signal electric charge read out from a sensor unit 11 in a vertical direction. Each of the vertical CCDs 13 is provided for a vertical column of the sensor units 11 in the matrix. The sensor units 11, the vertical CCDs 13 and the read-out gate units 12 form an image pickup area 14.

On the image pickup area 14, the sensor units 11 are each normally implemented by a PN-junction photo diode. Signal electric charge accumulated in a sensor unit 11 is read out by applying a read-out pulse, to be described later, to a read-out gate unit 12 associated with the sensor unit 11 and transferred to a vertical CCD 13 on a matrix column where the sensor unit 11 and the read-out gate unit 12 are located. The signal electric charge is transferred along the vertical CCD 13 driven by typically four vertical transfer clock signals øV1 to øV4 having first to fourth phases respectively which are different from each other. To put it in detail, pieces of signal electric charge are sequentially transferred in the vertical direction during part of a horizontal blanking period in units each corresponding to one scanning line (or one line).

On the vertical CCD 13, transfer electrodes for the first and third phases each serve as a gate electrode of the read-out gate unit 12. For this reason, among the four vertical transfer clock signals øV1 to øV4 having first to fourth phases respectively different from each other, the vertical transfer clock signal øV1 with the first phase and the vertical transfer clock signal øV3 with the third phase are set at three values at low, medium and high levels respectively. The low, medium and high levels are also referred to hereafter as "L", "M" and "H" levels respectively. A pulse at the third "H" level generated on a vertical transfer clock signal is used as the aforementioned read-out pulse applied to the read-out gate unit 12.

On the bottom side of the drawing plane of the image taking area 14, a horizontal CCD 15 is provided. Pieces of signal electric charge each corresponding to one line are transferred sequentially from the vertical CCDs 13 to the horizontal CCD 15. The horizontal CCD 15 is driven by typically two horizontal transfer clock signals øH1 and øH2 having first and second phases respectively which are different from each other. The pieces of signal electric charge, which each correspond to one line and are transferred in a vertical direction sequentially from the vertical CCDs 13, are transferred in a horizontal direction along the horizontal CCD 15 during a horizontal scanning period following a horizontal blanking period.

On the end of the horizontal CCD 15 at the transfer destination, a charge-to-voltage converting unit 16 is provided. Typically, the charge-to-voltage converting unit 16 has the configuration of a floating diffusion amplifier. The pieces of signal electric charges transferred along the CCD 15 are sequentially converted by the charge-to-voltage converting unit 16 into a voltage and finally output thereby as a voltage signal. The voltage signal is generated as a CCD output denoted by notation OUT in the figure which represents the quantity of the incident light from an object, the image of which is picked up. The description given so far explains the configuration of the CCD solid-state image sensing device 10 of the interline transfer system.

A timing generator 17 is used for generating a variety of timing signals including the vertical transfer clock signals øV1 to øV4 and the horizontal transfer clock signals øH1 and øH2 for driving the CCD solid-state image sensing device 10. In actuality, the timing generator 17 originally generates two sets of vertical transfer clock signals, i.e., vertical transfer clock signals øV11 to øV14 and øV21 to øV24, and either one of the sets is selected depending upon the operating mode to eventually produce the vertical transfer clock signals øV1 to øV4. To put it in detail, the vertical transfer clock signals øV11 to øV14 are to be selected in a first operating mode while the vertical transfer clock signals øV21 to øV24 are to be selected in a second operating mode. The first operating mode is also known as a frame read-out operating mode in which pieces of signal electric charge of each field are read out for every other picture element arranged in the vertical direction along a matrix column. On the other hand, the second operating mode is also referred to as a so-called line reducing operating mode in which only pieces of signal electric charge of a specific line are read out.

Figure 2A:
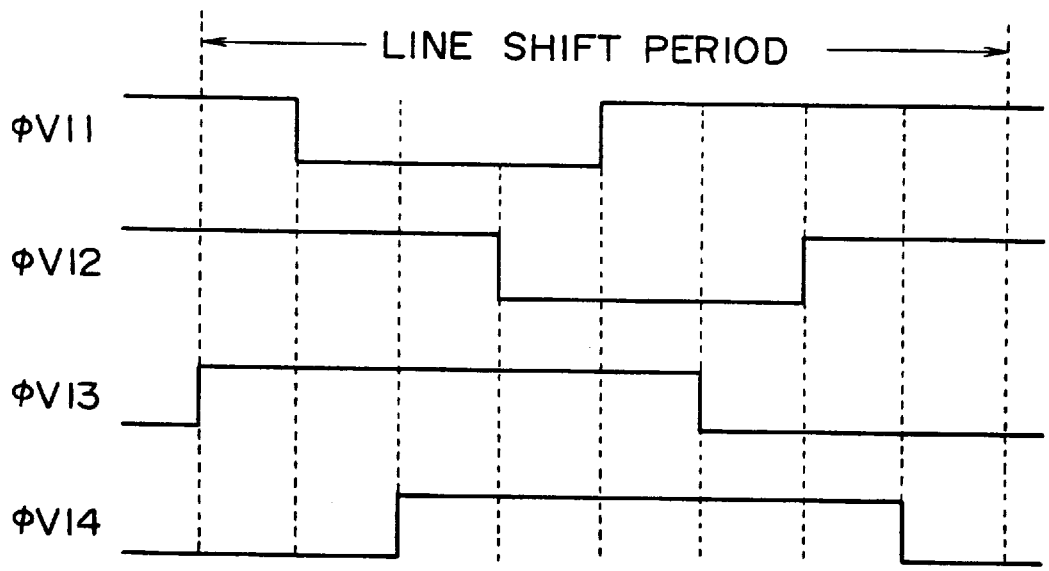
FIGS. 2A and 2B are diagrams each showing the waveforms of four vertical transfer clock signals with phases different from each other.

As shown in FIG. 2A, the four vertical transfer clock signals øV11 to øV14 for use in the frame read-out operating mode are generated as follows. The vertical transfer clock signals øV11 to øV12 are generated as negative pulses having phases shifted by $\pi/2$ from each other. The vertical transfer clock signal øV13 is generated as a positive pulse with a rising edge leading ahead of the falling edge of the negative pulse øV11 by $\pi/4$ and a falling edge thereof lagging behind the rising edge of the negative pulse øV11 also by $\pi/4$. By the same token, the vertical transfer clock signal øV14 is generated as a positive pulse with a rising edge leading ahead of the falling edge of the negative pulse øV12 by $\pi/4$ and a falling edge thereof lagging behind the rising edge of the negative pulse øV12 also by $\pi/4$.

Figure 2B:
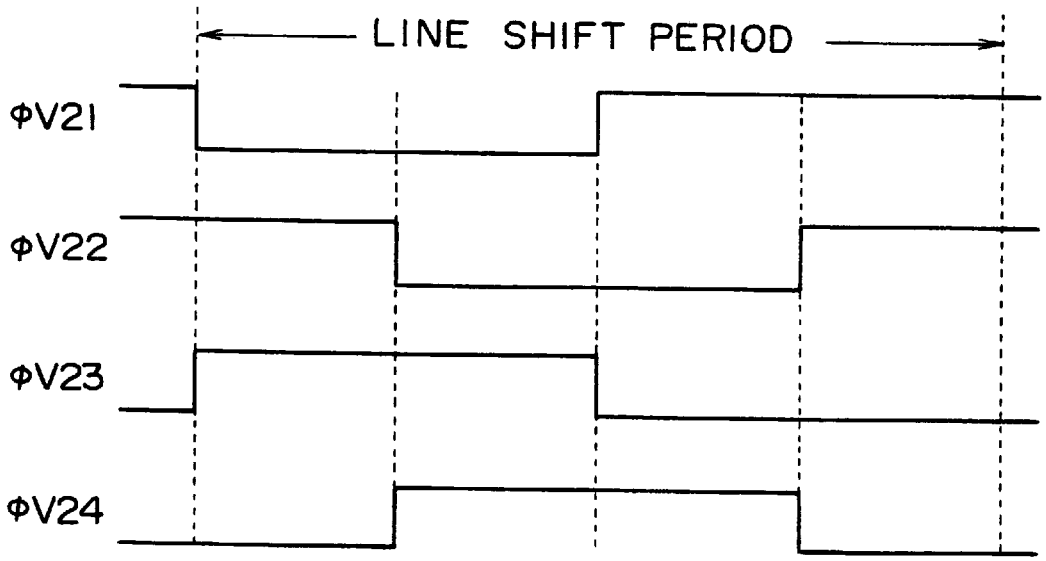

On the other hand, the four vertical transfer clock signals øV21 to øV24 for use in the line reducing operating mode are generated as follows. The vertical transfer clock signals øV21 and øV22 are generated as negative pulses having phases shifted by $\pi/2$ from each other while the vertical transfer clock signals øV23 and øV24 are generated as positive pulses having phases opposite to those of the pulses øV21 and øV22 respectively as shown in FIG. 2B. That is to say, the vertical transfer clock signals øV21 and øV23 form a pair of pulses with phases opposite to each other whereas the vertical transfer clock signals øV22 and øV24 form another pair of pulses also with phases opposite to each other.

The two sets of vertical transfer clock signals, i.e., the vertical transfer clock signals øV11 to øV14 and øV21 to øV24, are supplied to a signal switching circuit 18 for selecting either one out of the two sets in accordance with an operating mode select signal supplied thereto from an external source. The set of vertical transfer clock signals selected by the signal switching circuit 18 is output as the vertical transfer clock signals øV1 to øV4 for actually driving the vertical CCD 13 to the CCD solid-state image sensing device 10. To put it concretely, the vertical transfer clock signals øV11 to øV14 are selected in the frame read-out operating mode while the vertical transfer clock signals øV21 and øV24 are selected in the line reducing operating mode.

Figure 3:
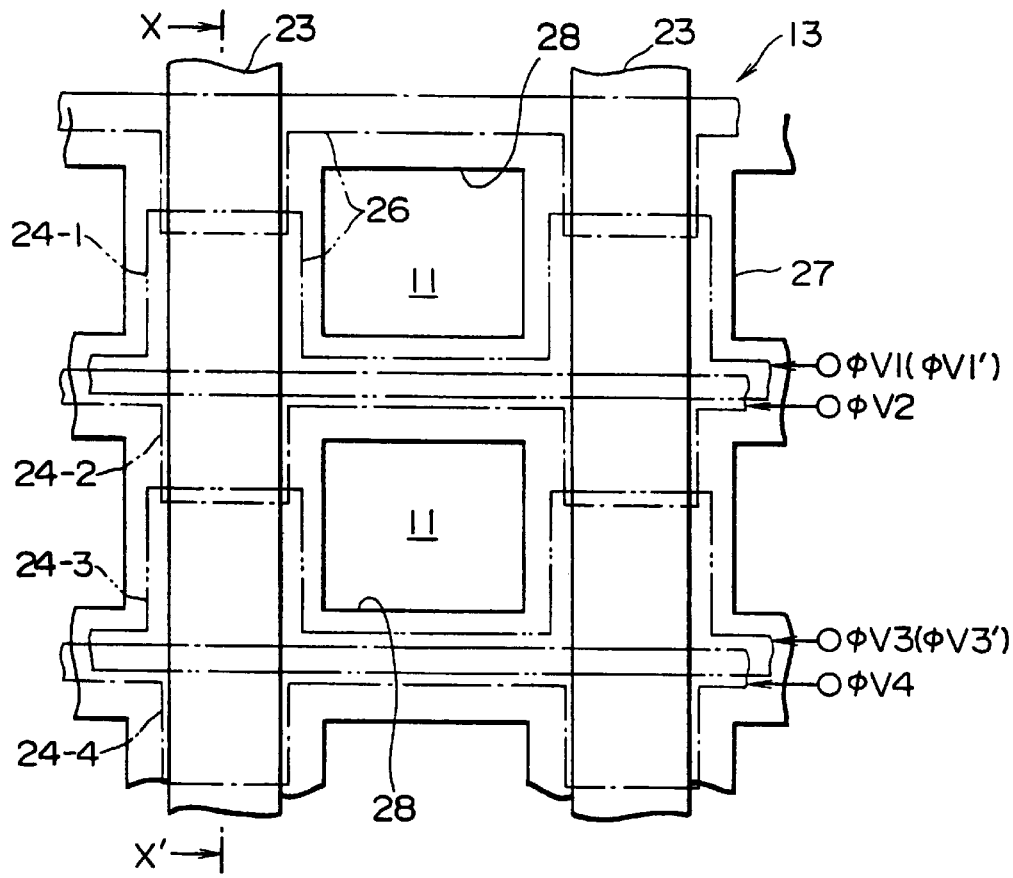
FIG. 3 is a diagram showing a typical plane pattern of the actual configuration of an image pickup area.
Figure 4:
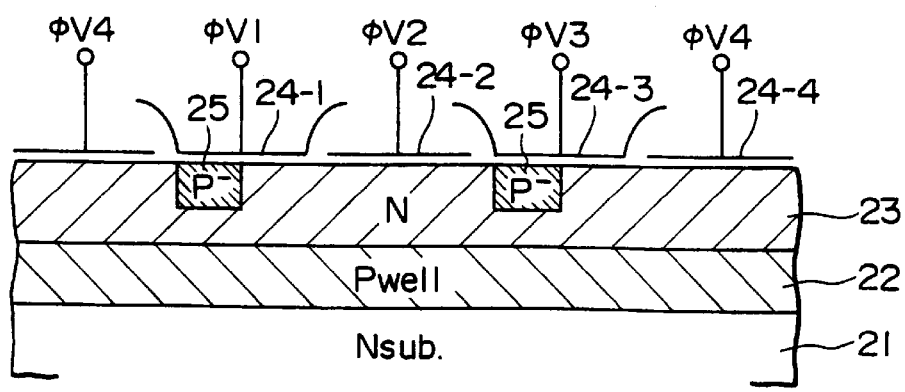
FIG. 4 is a diagram showing a cross section along a line indicated by arrows X and X' shown in FIG. 3.

FIG. 3 is a diagram showing a typical plane pattern of the actual configuration of the image pickup area 14. FIG. 4 is a diagram showing a cross section along a line indicated by arrows X and X' shown in FIG. 3. As shown in the figures, the vertical CCD 13 comprises a transfer channel 23 made of an N-type impurity material created on a P well 22 above an N-type substrate 21, and four transfer electrodes 24-1 to 24-4 for the four phases which are different from each other. The four transfer electrodes 24-1 to 24-4 are laid out on the transfer channel 23. The pattern of the four transfer electrodes 24-1 to 24-4 is repeated along the direction in which signal electric charge is transferred.

The transfer electrode 24-2 for the second phase and the transfer electrode 24-4 for the fourth phase are made of polysilicon of a first layer shown by a single dot line in FIG. 3. On the other hand, the transfer electrode 24-1 for the first phase and the transfer electrode 24-3 for the third phase are made of polysilicon of a second layer shown by a double dot line in the figure. In this way, the transfer electrodes 24-1 to 24-4 form a two layer electrode structure. It should be noted, however, that the material for creating the transfer electrodes 24-1 to 24-3 is not necessarily limited to polysilicon.

On regions on the transfer channel 23 above the substrate 21 beneath the transfer electrodes 24-1 and 24-3 for the first and third phases respectively, P-type impurity layers 25 are created. In actuality, as shown in FIG. 4, the P-type impurity layer 25 occupies only half of each of the regions beneath the transfer electrodes 24-1 and 24-3 on the upstream side of a direction in which signal electric charge is transferred, that is, a direction from the left to the right in FIG. 4. The P-type impurity layer 25 gives rise to a potential gradient decreasing in the direction of the transfer of the signal electric charge on each of the regions in the transfer channel 23 beneath the transfer electrodes 24-1 and 24-3. As a result, signal electric charge transferred beneath the transfer electrodes 24-1 and 24-3 moves gradually toward regions beneath the transfer electrodes 24-2 and 24-4 respectively due to the decreasing potential gradient.

On the first and second polysilicon layers serving as the transfer electrodes 24-1 to 24-4 at the sensor unit 11, a polysilicon opening 26 is provided. The upper surface of the transfer electrodes 24-1 to 24-4 are covered by a light shielding film 27 made of aluminum. A sensor opening 28 is created through the light shielding film 27 on a side more inner than the polysilicon opening 26. In some cases, a material other than aluminum is used for creating the light shielding film 27.

Figure 5:
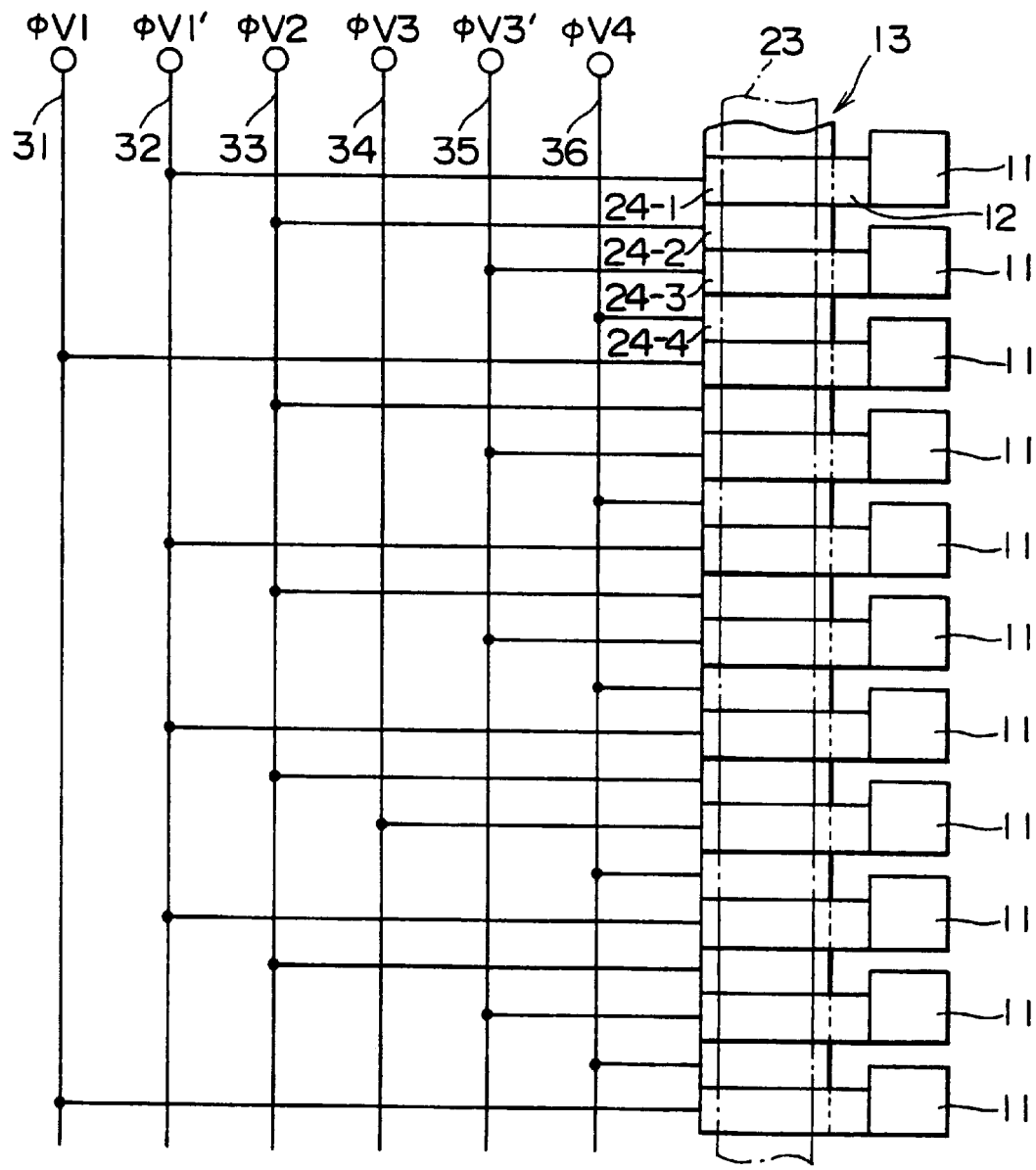
FIG. 5 is a diagram showing a wiring pattern of transfer electrodes on a vertical CCD.

FIG. 5 is a diagram showing a wiring pattern of the transfer electrodes 24-1 to 24-4 on the vertical CCD 13. In the present wiring system, in order to make the line reducing operation possible, the wiring of the vertical transfer clock signals øV1 and øV3 of the first and third phases respectively is particularly elaborated. To put it concretely, in the present embodiment, a set of vertical transfer clock signals øV1 and øV1' of the first phase and another set of vertical transfer clock signals øV3 and øV3' of the third phase are provided as a typical means for implementing a line reducing operation for every other line. Since the vertical transfer clock signals øV2 and øV4 are also used, a total of six bus lines 31 to 36 are implemented in the wiring system.

The first phase transfer electrodes 24-1 are connected to the bus line 31 for transferring the vertical transfer clock signal øV1 for every other seven picture elements. First phase transfer electrodes 24-1 other than those connected to the bus line 31 are connected to the bus line 32 for transferring the vertical transfer clock signal øV1' for every other picture element. The second phase transfer electrodes 24-2 are connected to the bus line 33 for transferring the vertical transfer clock signal øV2 for every other picture element.

By the same token, the third phase transfer electrodes 24-3 are connected to the bus line 34 for transferring the vertical transfer clock signal øV3 for every other seven picture elements. Third phase transfer electrodes 24-3 other than those connected to the bus line 34 are connected to the bus line 35 for transferring the vertical transfer clock signal øV3' for every other picture element. The fourth phase transfer electrodes 24-4 are connected to the bus line 36 for transferring the vertical transfer clock signal øV4 for every other picture element.

On the vertical transfer clock signals øV1, øV1', øV3 and øV3', read-out pulses for driving read-out gate units 12 may be generated. When read-out pulses generated on the vertical transfer clock signals øV1, øV1', øV3 and øV3' are set to the "H" level, the third value described earlier, signal electric charge is read out from sensor units 11. In a frame read-out operating mode, the read-out pulses are generated on all the vertical transfer clock signals øV1, øV1', øV3 and øV3', being set to the "H" level as shown in FIG. 6A. In a line reducing operating mode, on the other hand, the read-out pulses are generated only on the vertical transfer clock signals øV1 and øV3, being set to the "H" level as shown in FIG. 6B.

The vertical transfer clock signals øV1, øV1', øV3 and øV3' implement a line reducing operation to read signal electric charge for every other line where a line is defined as two picture elements arranged in the vertical direction. It should be noted that, in a frame read-out operating mode, the read-out pulses of the vertical transfer clock signals øV1 and øV1' are generated for a first field (an odd or even field) while the read-out pulses of the vertical transfer clock signals øV3 and øV3' are generated for a second field (an even or odd field). In a line reducing operating mode, on the other hand, read-out pulses are raised on the vertical transfer clock signals øV1 and øV3 for both the first and second fields.

In order to provide the vertical transfer clock signals described above, the timing generator 17 shown in FIG. 1 generates vertical transfer clock signals øV11, øV11', øV12, øV13, øV13' and øV14 for the frame read-out operating mode and vertical transfer clock signals øV21, øV21', øV22, øV23, øV23' and øV24 for the line reducing operating mode. As described earlier, however, in a line reducing operating mode, only the vertical transfer clock signals øV21 and øV23 of the first and third phases are generated and the vertical transfer clock signals øV21' and øV23' are not.

The following is description of operations to read out and transfer signal electric charge in a vertical direction in the frame read-out operating mode and the line reducing operating mode in the solid-state image sensing apparatus implemented by the present embodiment having the configuration described above.

It should be noted, when the mode is switched from the frame read-out operating mode to the line reducing operating mode or vice versa, the operating mode select signal from an external source is provided to the clock switching circuit 18 shown in FIG. 1 as described earlier, causing the clock switching circuit 18 to select in the frame read-out operating mode the vertical transfer clock signals øV11, øV11', øV12, øV13, øV13') and øV14 generated by the timing generator 17 or, in the line reducing operating mode, the vertical transfer clock signals øV21, øV21', øV22, øV23, øV23' and øV24 generated by the timing generator 17 and to output the selected signals as the vertical transfer clock signals øV1, øV1', øV3, øV3' and øV4 to the CCD solid-state image sensing device 10 for use in driving the vertical CCDs 13.

Figure 7:
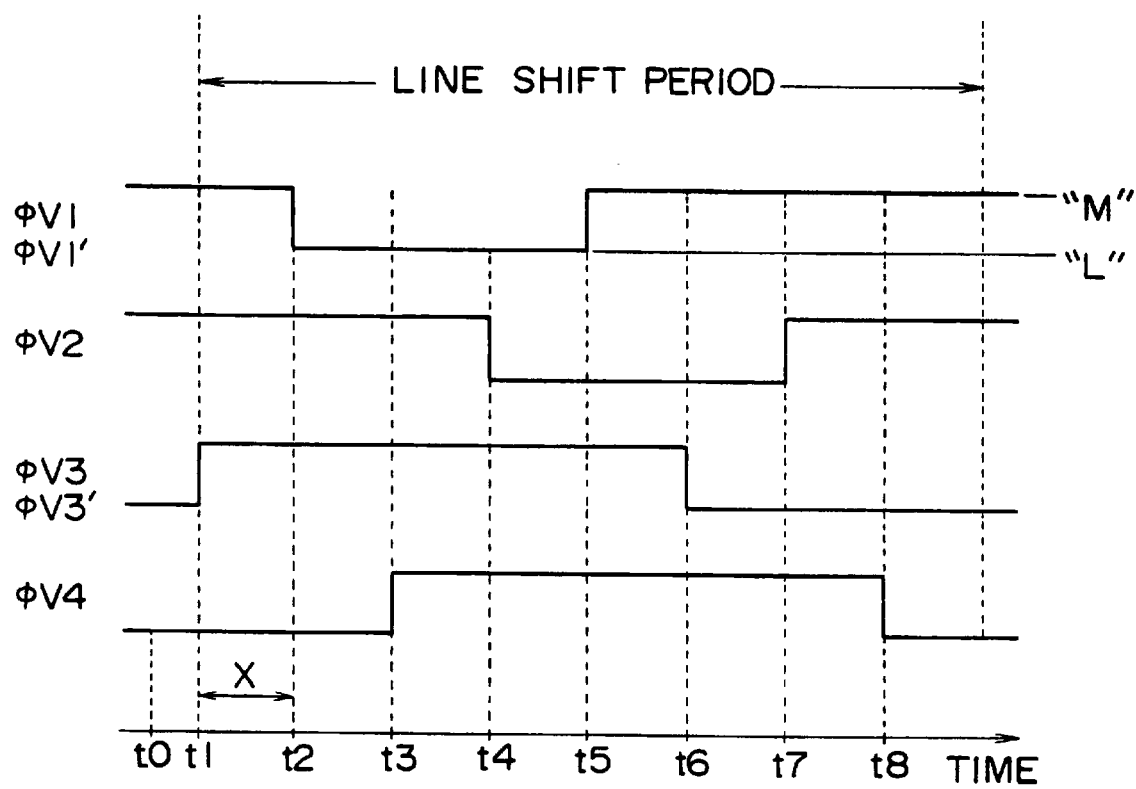
FIG. 7 is timing charts of a frame read-out operating mode.
Figure 8:
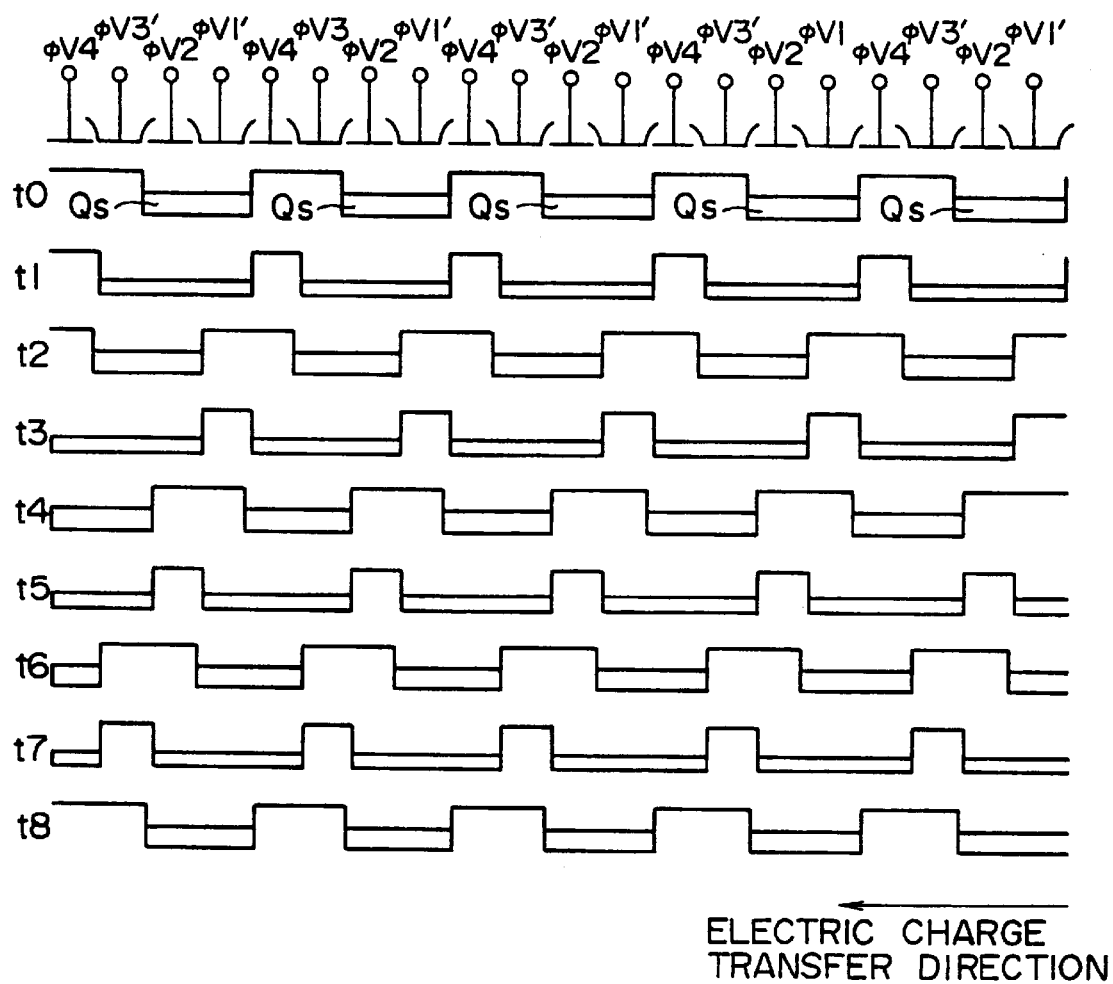
FIG. 8 is a diagram showing electric potentials in a frame read-out operating mode.

First of all, the operations to read out and transfer signal electric charge in a vertical direction in the frame read-out operating mode are explained by referring to the timing charts shown in FIG. 7 and the potential diagram shown in FIG. 8. It should be noted that, the direction from the right to the left in FIG. 8 is a direction in which the signal electric charge is transferred. In order to read out pieces of signal electric charge from sensor units 11 shown in FIG. 5, on the first field, read-out pulses on the vertical transfer clock signals øV1 and øV1' shown in FIG. 6A are applied to the transfer electrodes 24-1 for the first phase. Since the read-out pulses indicated by solid lines in FIG. 6A are supplied to read-out gate units 12 for the first phase, pieces of signal electric charges are read out and transferred to the vertical CCD 13 from every other picture element arranged in the vertical direction.

The read out signal electric charge is transferred in a vertical direction in line units during a horizontal blanking period by a transfer operation of the vertical CCD 13. At a point of time t0 immediately prior to transition to a line shift period shown in FIG. 7, the vertical transfer clock signals øV1 and øV1' of the first phase and the vertical transfer clock signal øV2 of the second phase are both set at the "M" level. Accordingly, electric potentials beneath the transfer electrodes 24-1 and 24-3 for the first and second phases are deep, resulting in a packet in which the read out signal electric charge Qs is accumulated.

Then, a line shift operation shown in FIG. 7 is started. When the vertical transfer clock signals øV3 and øV3' of the third phase transit from the "L" level to the "M" level at a point of time t1, the electric potential beneath the transfer electrode 24-3 for the third phase becomes deep. This deep potential causes the signal electric charge Qs accumulated in the packet beneath the transfer electrodes 24-1 and 24-2 for the first and second phases respectively to move to a region beneath the transfer electrode 24-3 for the third phase. Then, as the vertical transfer clock signals øV1 and øV1' of the first phase transit to the "L" level at a point of time t2, the electric potential beneath the transfer electrode 24-1 for the first phase becomes shallow, causing the signal electric charge Qs to be accumulated in the regions beneath the transfer electrodes 24-2 and 24-3 for the second and third phases respectively.

Subsequently, when the vertical transfer clock signal øV4 of the fourth phase transits from the "L" level to the "H" level at a point of time t3, the electric potential beneath the transfer electrode 24-4 for the fourth phase becomes deep, causing the signal electric charge Qs accumulated in the regions beneath the transfer electrodes 24-2 and 24-3 for the second and third phases respectively to move to a region beneath the transfer electrode 24-4 for the fourth phase. Then, as the vertical transfer clock signal øV2 of the second phase transits to the "L" level at a point of time t4, the electric potential beneath the transfer electrode 24-2 for the second phase becomes shallow, causing the signal electric charge Qs to be accumulated in the regions beneath the transfer electrodes 24-3 and 24-4 for the third and fourth phases respectively.

Subsequently, when the vertical transfer clock signals øV1 and øV1' of the first phase transits to the "M" level at a point of time t5, the electric potential beneath the transfer electrode 24-1 for the first phase becomes deep, causing the signal electric charge Qs accumulated in the regions beneath the transfer electrodes 24-3 and 24-4 for the third and fourth phases respectively to move to a region beneath the transfer electrode 24-1 of the first phase. Then, as the vertical transfer clock signals øV3 and øV3' of the third phase transit to the "L" level at a point of time t6, the electric potential beneath the transfer electrode 24-3 for the third phase becomes shallow, causing the signal electric charge Qs to be accumulated in the regions beneath the transfer electrodes 24-4 and 24-1 for the fourth and first phases respectively.

Subsequently, when the vertical transfer clock signal øV2 of the second phase transits to the "M" level at a point of time t7, the electric potential beneath the transfer electrode 24-2 for the second phase becomes deep, causing the signal electric charge Qs accumulated in the regions beneath the transfer electrode 24-2 for the second phase respectively to move to the regions beneath the transfer electrodes 24-4 and 24-1 of the fourth and first phases respectively. Then, as the vertical transfer clock signal øV4 of the fourth phase transits to the "L" level at a point of time t8, the electric potential beneath the transfer electrode 24-4 for the fourth phase becomes shallow, causing the signal electric charge Qs to be accumulated in the regions beneath the transfer electrodes 24-1 and 24-2 for the first and second phases respectively.

In a series of vertical transfer operations during the line shift period described above, pieces of signal electric charge are read out from the sensor units 11 and the signal electric charge Qs accumulated in the packet beneath the transfer electrodes 24-1 and 24-2 for the first and second phases respectively is shifted by one line, causing the next pieces of signal electric charge to be accumulated sequentially in the packet beneath the transfer electrodes 24-1 and 24-2 for the first and second phases respectively. At that time, signal electric charge of the amount of one line at the bottom edge of the image taking area 14 is transferred to the horizontal CCD 15. Then, the signal electric charge transferred to the horizontal CCD 15 is transferred sequentially in the horizontal direction in a transfer operation of the horizontal CCD 15 during a horizontal scanning period after a horizontal blanking period.

It should be noted that the above description explains transfer operations for the first field. In the case of the second field, the vertical transfer clock signals øV3 and øV3' shown in FIG. 6A are applied to the transfer electrode 24-3 for the third phase, causing read-out pulses indicated by dotted lines in the figure to be supplied to the read-out gate unit 12 for the third phase. As a result, pieces of signal electric charge are read out from sensor units 11 different from those of the first line for every other picture element arranged in the vertical direction and transferred to the vertical CCD 13.

Then, the subsequent operations are carried out in the same way as that of the first field.

Figure 9:
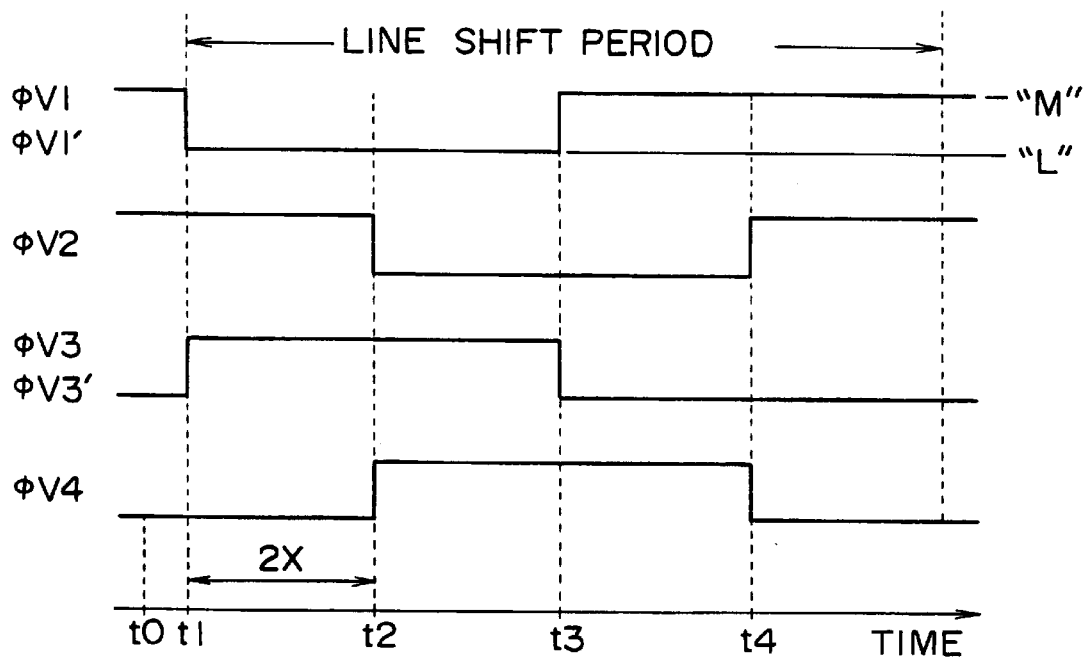
FIG. 9 is timing charts of a line reducing operating mode.
Figure 10:
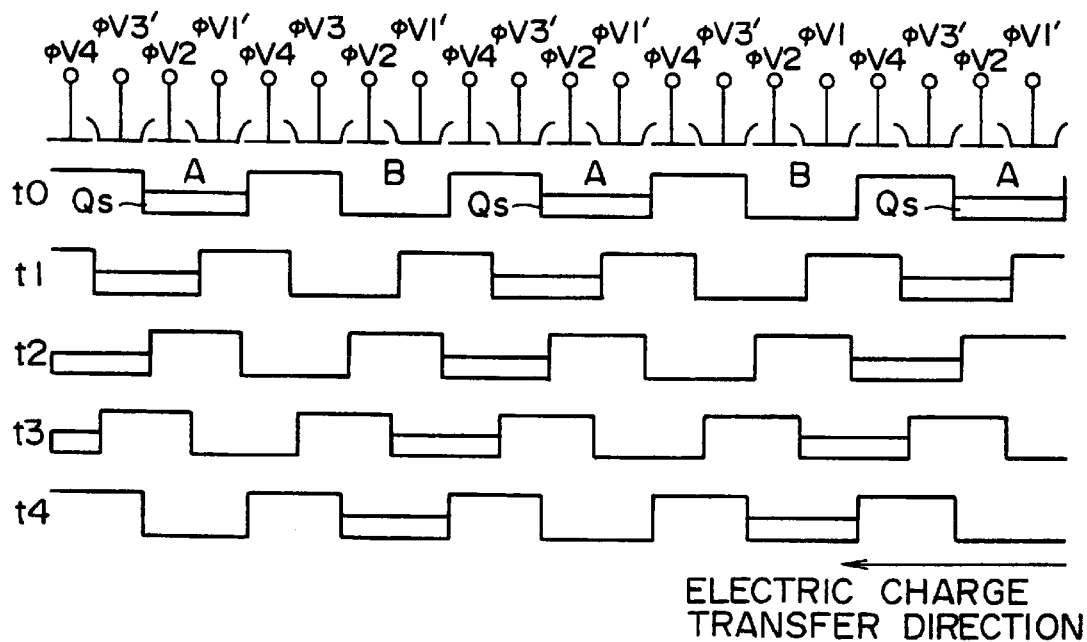
FIG. 10 is a diagram showing electric potentials in a line reducing operating mode.

Next, the operations to read out and transfer signal electric charge along a vertical CCD in the line reducing operating mode are explained by referring to the timing charts shown in FIG. 9 and the potential diagram shown in FIG. 10. It should be noted that, the direction from the right to the left in FIG. 10 is a direction in which the signal electric charge is transferred. When pieces of signal electric charge are read out from sensor units 11 shown in FIG. 5, on the first and second fields, the vertical transfer clock signal øV1 and øV1' shown in FIG. 6B are applied to the transfer electrode 24-1 for the first phase while the vertical transfer clock signals øV3 and øV3' shown in the same figure are applied to the transfer electrode 24-3 for the third phase.

It is obvious from FIG. 6B that, at the time, read-out pulses are generated on the transfer clock signals øV1 and øV3 but no read-out pulses are generated on the transfer clock signals øV1' and øV3'. Thus, the read-out pulses are supplied only to the read-out gate units 12 of the transfer electrodes 24-1 and 24-3 to which the vertical transfer clock signals øV1 and øV3 are applied. As a result, pieces of signal electric charge are transferred to the vertical CCD 13 only from the sensor units 11 associated with the transfer electrodes 24-1 and 24-3.

The read out signal electric charge is transferred in a vertical direction in line units during a horizontal blanking period by a transfer operation of the vertical CCD 13. At a point of time t0 immediately prior to transition to a line shift period shown in FIG. 9, the vertical transfer clock signals øV1 and øV1' of the first phase and the vertical transfer clock signal øV2 of the second phase are both set at the "M" level. Accordingly, electric potentials beneath the transfer electrodes 24-1 and 24-2 for the first and second phases are deep, resulting in packets A and B in which the read out signal electric charge Qs is accumulated.

The, a line shift operation shown in FIG. 9 is started. When the vertical transfer clock signals øV3 and øV3' of the third phase transit to the "M" level at a point of time t1, the electric potential beneath the transfer electrode 24-1 for the first phase becomes shallow while, at the same time, the electric potential beneath the transfer electrode 24-3 for the third phase becomes deep. As a result, the signal electric charge Qs accumulated in the packet A beneath the transfer electrodes 24-1 and 24-2 for the first and second phases respectively moves to the regions beneath the transfer electrodes 24-2 and 24-3 for the second and third phases to be accumulated therein.

Then, as the vertical transfer clock signal øV2 of the second phase transits to the "L" level while the vertical transfer clock signal øV4 of the fourth phase transit to the "M" level at a point of time t2, the electric potential beneath the transfer electrode 24-2 for the second phase becomes shallow while, at the same time, the electric potential beneath the transfer electrode 24-4 for the fourth phase becomes deep, causing the signal electric charge Qs to be accumulated in the regions beneath the transfer electrodes 24-2 and 24-3 for the second and third phases to move to the regions beneath the transfer electrodes 24-3 and 24-4 for the third and fourth phases respectively to be stored therein.

Subsequently, when the vertical transfer clock signals øV1 and øV1' of the first phase transit to the "M" level while the vertical transfer clock signals øV3 and øV3' of the third phase transit to the "L" level at a point of time t3, the electric potential beneath the transfer electrode 24-1 for the first phase becomes deep while, at the same time, the electric potential beneath the transfer electrode 24-3 for the third phase becomes shallow, causing the signal electric charge Qs accumulated in the regions beneath the transfer electrodes 24-3 and 24-4 for the third and fourth phases to move to the regions beneath the transfer electrodes 24-4 and 24-1 of the fourth and first phases respectively to be accumulated therein.

Then, as the vertical transfer clock signal øV2 of the second phase transits to the "M" level while the vertical transfer clock signal øV4 of the fourth phase transits to the "L" level at a point of time t4, the electric potential beneath the transfer electrode 24-2 for the second phase becomes deep while, at the same time, the electric potential beneath the transfer electrode 24-4 for the fourth phase becomes shallow, causing the signal electric charge Qs accumulated in the regions beneath the transfer electrodes 24-4 and 24-1 for the fourth and first phases to move to the packet B beneath the transfer electrodes 24-1 and 24-2 for the first and second phases respectively to be accumulated therein.

In a series of vertical transfer operations during the line shift period described above, pieces of signal electric charges are read out from the sensor units 11 and the signal electric charge Qs accumulated in the packet A beneath the transfer electrodes 24-1 and 24-2 for the first and second phases is shifted by one line to the empty packet B beneath the subsequent transfer electrodes 24-1 and 24-2 for the first and second phases respectively while the no-signal state of the packet B is transferred to the next packet A and so on. As described above, in the present embodiment, for both the first and second fields, pieces of signal electric charge are read out from the same line. It should be noted, however, that by modifying the wiring of the bus lines for transmitting the vertical transfer clock signals øV1 (øV1') to øV4, the line from which signal electric charge is read out in the case of the first field can be made different from the line for the second field.

By the way, the line reducing operations described above may result in empty packets B not containing signal electric charge before and after a packet A containing signal electric charge Qs. In this case, in order to output the signal electric charge Qs from each line, it is necessary to increase the number of line shifts described above by a quantity to compensate for the empty packets B during each horizontal blanking period. In the case of a line reducing operation for every other line like the one described above, the line shift period shown in FIG. 9 and a shift operation shown in FIG. 10 each need to be implemented repeatedly twice.

In this way, by increasing the number of shifts by a quantity to compensate for empty packets B during each horizontal blanking period in a line reducing operation, pieces of signal electric charge accumulated in packets A are mixed with no-signal state of the empty packets B in the horizontal CCD 15 during each horizontal blanking period. As a result, since the no-signal periods are eliminated, signal electric charge Qs is output for each line.

It is obvious from what is described above that, during a line shift in a line reducing operating mode according to the present invention, the vertical transfer clock signals øV1 and øV1' of the first phase have a phase opposite to that of the vertical transfer clock signals øV3 and øV3' of the third phase whereas the vertical transfer clock signal øV2 of the second phase has a phase opposite to that of the vertical transfer clock signal øV4 of the fourth phase as shown in FIG. 9 to implement complementary two-phase driving. Here, much like the frame read-out operating mode, however, the case of four-phase driving using the vertical transfer clock signals øV1 (øV1') to øV4 having phase relations like the ones shown in FIG. 7 is studied.

In the case of the vertical transfer clock signals øV1 (øV1') to øV4 shown in FIG. 7, the difference in phase among the clock signals is π/4. Thus, an overlap period x of the clock signals is decreased by an amount corresponding to an increase in line shift count. Here, because the vertical transfer clock signals øV1 (øV1') to øV4 are transferred from both sides of the image taking area 14 to the transfer electrodes 24-1 to 24-4 of the vertical CCD 13, the amplitude of the vertical transfer clock signals øV1 (øV1') to øV4 is reduced at the center of the image taking area 14 due to propagation delays. As a result, the amount of electric charge that can be handled by the vertical CCD 13 is decreased, deteriorating the transfer efficiency.

According to the present embodiment, on the other hand, the driving of the vertical CCD 13 in a line reducing operating mode is carried out by adopting a two-phase driving technique so that the difference in phase between the vertical transfer clock signal øV1 (øV1') and the vertical transfer clock signal øV2 as well as between the vertical transfer clock signals øV3 (øV3') and the vertical transfer clock signal øV4 is π/2, resulting in an overlap period of the two clock signals twice that of the four-phase driving (2×x=2x). A long overlap period of the vertical transfer clock signals is advantageous to transfers of signal electric charge.

That is to say, to explain the transfer operation in a line reducing operating mode in more detail, a decreasing potential gradient in the direction of the electric charge transfer is formed in each of the regions beneath the transfer electrodes 24-1 and 24-3 for the first and third phases respectively as was described earlier by referring to FIG. 4. As a result, pieces of signal electric charge Qs move from the regions beneath the transfer electrodes 24-1 and 24-3 for the first and third phases to the regions beneath the transfer electrodes 24-2 and 24-4 for the second and fourth phases during the overlap period 2x.

It is obvious that, if the overlap period 2x of the vertical transfer clock signals is long, most of signal electric charge Qs in the regions beneath the transfer electrodes 24-1 and 24-3 for the first and third phases can move to the regions beneath the transfer electrode 24-2 and 24-4 for the second and fourth phases respectively. Then, at the next transfer time, the signal electric charge Qs is transferred the regions beneath the transfer electrodes 24-2 and 24-3 for the second and third phases as well as the regions beneath the transfer electrodes 24-4 and 24-1 for the fourth and first phases respectively with a high degree of reliability even if the amplitude of the vertical transfer clock signals øV1 (øV1') to øV4 is reduced due to propagation delays at the center of the image taking area 14. As a result, much like the complementary two-phase driving, a long overlap period of the vertical transfer clock signals is advantageous to the transfers of the signal electric charge Qs, giving rise to a transfer of the signal electric charge Qs, giving rise to a transfer efficiency improved over that of the four-phase driving.

Figure 11A:
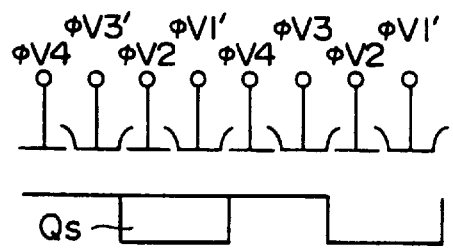
FIGS. 11A and 11B are explanatory diagrams each showing the amount of electric charge handled by the vertical CCD.
Figure 11B:
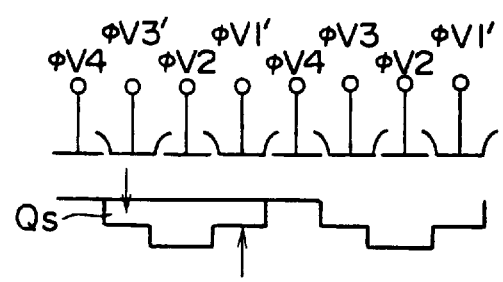
Figure 12:
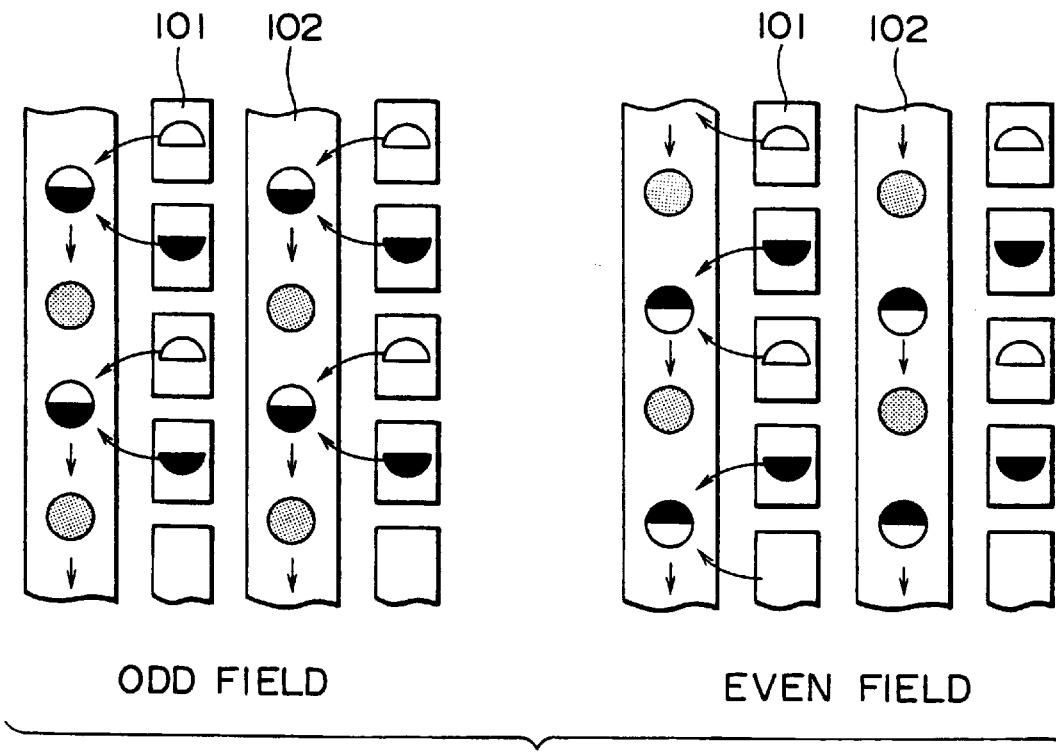
FIG. 12 is a diagram used for explaining a field read-out technique.
Figure 13:
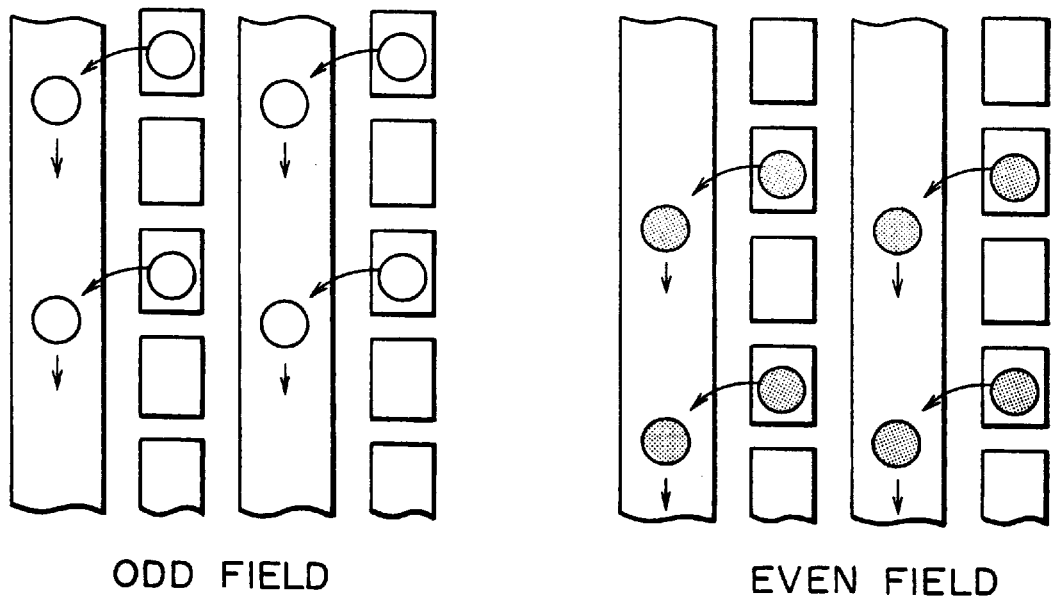
FIG. 13 is a diagram used for explaining a frame read-out technique.
Figure 14:
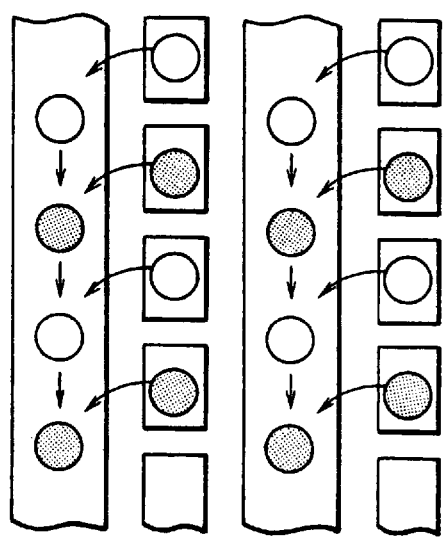
FIG. 14 is a diagram used for explaining an all-pixel read-out technique.

Next, the amount of electric charge that can be handled by the vertical CCD 13 is studied. In the case of the four-phase driving, signal electric charge Qs can be accumulated up to a state shown in FIG. 11A. In the case of the complementary two-phase driving, on the other hand, electric potentials on both sides of a packet in which signal electric charge Qs is accumulated work at the same time, causing a state of accumulation of signal electric charge Qs shown in FIG. 11B to be generated temporarily. As a result, even though the amount of electric charge does not vary theoretically, it shows a tendency to be smaller to a certain degree than the four-phase driving due to, among other causes, timing discrepancies.

In the case of a line reducing operation, however, an empty packet B exists after a packet A containing signal electric charge Qs. Thus, even if the signal electric charge Qs leaks from the packet A, there will be no problem since electric charge contained in the packets A and B are eventually mixed in the horizontal CCD 15 as long as no leakage exists in the packet B after the packet A. As a result, the amount of electric charge that can be handled by the vertical CCD 13 does not decrease.

It should be noted that, while the present invention has been described with reference to the illustrative embodiment, the description is not intended to be construed in a limiting sense. That is to say, it is to be understood that the subject matter encompassed by the present invention is not limited to the embodiment. For example, in a line reducing operating mode, a line reducing operation is carried out for each other line. However, the scope of the present invention is not limited to this kind of line reducing operation. The way in which a line reducing operation can be carried out is arbitrary. In a word, read-out pulses are applied to read-out gate units 12 located at predetermined intervals in order to read out only signal electric charge from sensor units 11 for picture elements on some lines and transfer the signal electric charge to the vertical CCD 13.

In this way, by applying read-out pulses to read-out gate units 12 located at predetermined intervals in order to read out only signal electric charge from sensor units 11 for picture elements on some lines and transfer the signal electric charge to the vertical CCD 13, the number of lines of the pickup image signal to be output can be reduced and, by carrying out an operation to obtain a higher-speed pickup image signal, that is, by carrying out line reducing operations, it is possible to obtain a higher-speed pickup image signal, for example, an output signal conforming to the NTSC system without the need to increase the data rate to a high value.

In addition, in a line reducing operating mode, by applying the complementary two-phase driving to the vertical CCD 13, the overlap period of the vertical transfer clock signals can be lengthened. As a result, the transfer efficiency of the vertical CCD 13 can be increased by maintaining the amount of electric charge that can be handled by the vertical CCD 13 even if the amplitude of the vertical transfer clock signals øV1 (øV1') to øV4 is reduced at the center of the image taking area 14 due to propagation delays.

It is also worth noting that the description given so far with reference to the embodiment implementing a CCD solid-state image sensing device of the interline transfer system is not intended to be construed in a limiting sense. That is to say, it is to be understood that the scope of the present invention is not limited to the CCD solid-state image sensing device of the interline transfer system. For example, the present invention can also be applied as well to a CCD solid-state image sensing device of a system other than the interline transfer system and even to a solid-state image sensing device using an element other than the CCD.

In addition, in the embodiment, signal electric charge is transferred along the vertical CCD by using a four-phase driving technique as described above. It should be noted, however, that the scope of the present embodiment is not limited to the four-phase driving. If a driving technique of an even phase count such as a six-phase or eight-phase driving technique is adopted, it is possible to carry out a line reducing operation wherein read-out pulses are applied to read-out gate units located at predetermined intervals in order to read out only signal electric charge from sensor units for picture elements on some lines and transfer the signal electric charge to the vertical CCD 13.

Figure 15:
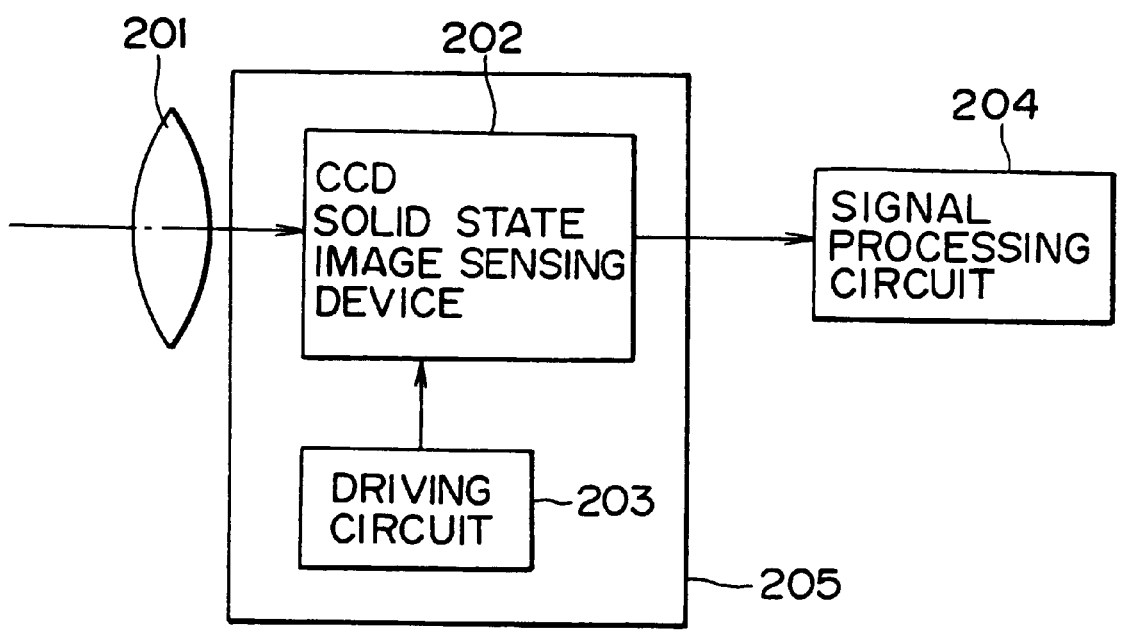
FIG. 15 is a diagram showing a configuration of a camera provided by the present invention.
Figure 16:
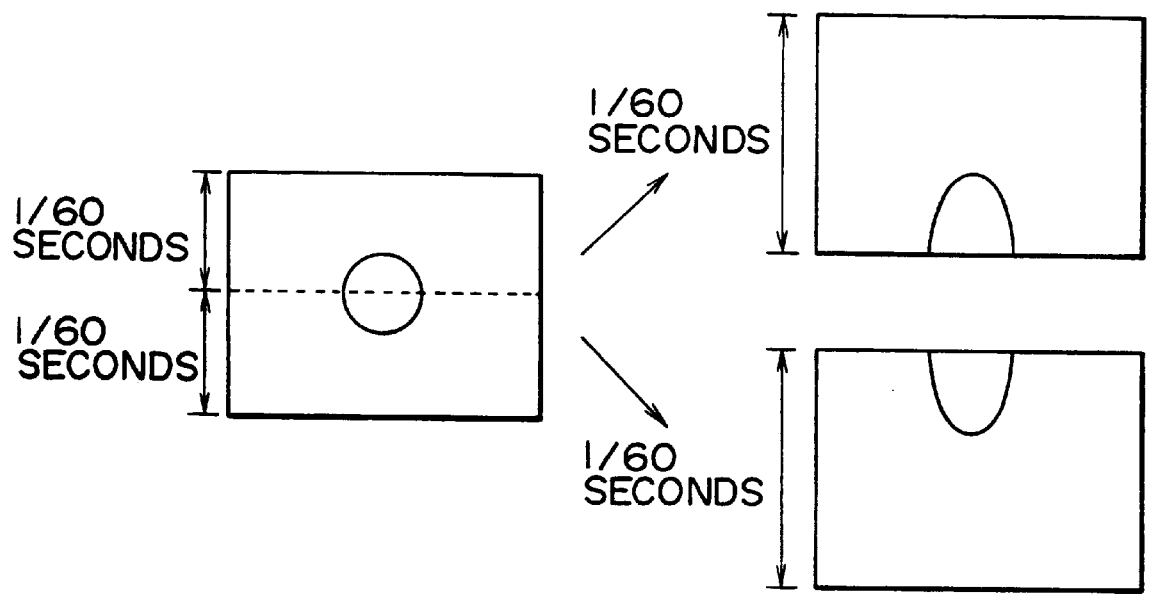
FIG. 16 is a diagram showing a relation between the output of an image sensing device and the monitor display.
Figure 17:
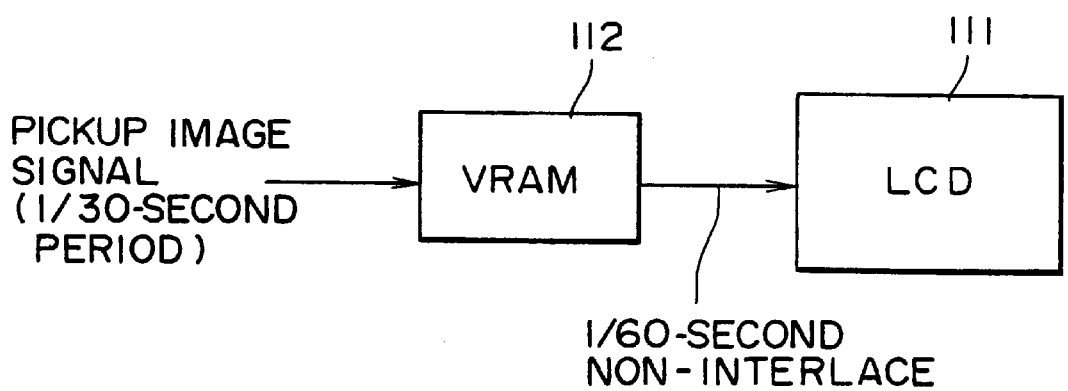
FIG. 17 is a block diagram showing the configuration of a display system employing a VRAM.

FIG. 15 is a diagram showing a configuration of a camera provided by the present invention. As shown in the figure, a light coming from an object, the image of which is to be picked up, is lead to an image pickup area of a CCD solid-state image sensing device 202 employed in a CCD solid-state image sensing apparatus 205 by an optical system such as a lens 201. As the CCD solid-state image sensing apparatus 205, the CCD solid-state image sensing apparatus implemented by the embodiment described above is employed. A variety of driving control such as operations to read out signal electric charge, transfer the signal electric charge along the vertical CCDs and transfer the signal electric charge along the vertical CCDs and transfer the signal electric charge along the horizontal CCD as well as an operation to switch the mode from the frame read-out operating mode to the line reducing operating mode and vice versa in the CCD solid-state image sensing apparatus 205 is carried out by a driving circuit 203. An image output of the CCD solid-state image sensing apparatus 205 undergoes a variety of signal processing carried out by a signal processing circuit 204.

As described above, according to the present invention, by applying read-out pulses to read-out gate units located at predetermined intervals in order to read out only signal electric charge from sensor units for picture elements arranged in the vertical direction on some lines and transfer the signal electric charge to the vertical CCD, line reducing operations to reduce the number of lines of the pickup image signal to be output can be carried out. As a result, by merely modifying the configuration of the driving system of the solid-state image sensing device, the line reducing operation can be implemented, allowing a higher-speed pickup image signal to be obtained by means of a simple configuration. In addition, by driving the vertical transfer unit using a combination of pairs of vertical transfer clock signals with phases opposite to each other in implementing vertical transfer driving in a line reducing operation, a vertical transfer can be carried out in a state with the overlap period of the vertical transfer clock signals lengthened, allowing the transfer efficiency of the vertical transfer unit to be improved.

What is claimed is:

1. A solid-state image sensing apparatus comprising:
    a solid-state image sensing device including:
        a plurality of sensor units arranged to form a matrix for converting light into signal electric charge;
        a plurality of read-out gate units each associated with one of said sensor units for reading out said signal electric charge resulting from conversion of said light from said associated sensor unit;
        vertical transfer units each for transferring said signal electric charge read out by said read-out gate units in a vertical direction; and
        a horizontal transfer unit for transferring said signal electric charge transferred by said vertical transfer unit in a horizontal direction, and
    a driving system which is used for:
        reading out signal electric charge only from some of said sensor units arranged in the vertical direction in a state with a filled packet containing signal electric charge coexisting in said vertical transfer unit with empty packets each with no electric charge following said filled packet in a transfer direction by applying read-out pulses to some of said read-out gate units located at predetermined intervals; and
        driving each of said vertical transfer units by combining pairs of vertical transfer clock signals having phases opposite to each other and mixing information of said filled packet containing signal electric charge with information of at least one of said empty packets following said filled packet in said vertical transfer unit into mixed information in said horizontal transfer unit.

2. A driving method to be adopted in a solid-state image sensing apparatus having a solid-state image sensing device comprising:
    a plurality of sensor units arranged to form a matrix for converting a light into signal electric charge;
    a plurality of read-out gate units each associated with one of said sensor units for reading out said signal electric charge resulting from conversion of said light from said associated sensor unit;
    vertical transfer units each for transferring said signal electric charge read out by said read-out gate units in a vertical direction; and
    a horizontal transfer unit for transferring said signal electric charge transferred by said vertical transfer unit in a horizontal direction,
    said driving method comprising the steps of:
        reading out signal electric charge only from some of said sensor units arranged in the vertical direction in a state with a filled packet containing signal electric charge coexisting in said vertical transfer unit with empty packets each with no electric charge following said filled packet in a transfer direction by applying read-out pulses to some of said read-out gate units located at predetermined intervals; and
        driving each of said vertical transfer units by combining pairs of vertical transfer clock signals having phases opposite to each other and mixing information of said filled packet containing signal electric charge with information of at least one of said empty packets following said filled packet in said vertical transfer unit into mixed information in said horizontal transfer unit.

3. A camera comprising:
    a solid-state image sensing apparatus including:
        a plurality of sensor units arranged to form a matrix for converting light into signal electric charge;
        a plurality of read-out gate units each associated with one of said sensor units for reading out said signal electric charge resulting from conversion of said light from said associated sensor unit;
        vertical transfer units each for transferring said signal electric charge read out by said read-out gate units in a vertical direction; and
        a horizontal transfer unit for transferring said signal electric charge transferred by said vertical transfer unit in a horizontal direction,
    a driving system which is used for:
        reading out signal electric charge only from some of said sensor units arranged in the vertical direction in a state with a filled packet containing signal electric charge coexisting in said vertical transfer unit with empty packets each with no electric charge following said filled packet in a transfer direction by applying read-out pulses to some of said read-out gate units located at predetermined intervals; and driving each of said vertical transfer units by combining pairs of vertical transfer clock signals having phases opposite to each other and mixing information of said filled packet containing signal electric charge with information of at least one of said empty packets following said filled packet in said vertical transfer unit into mixed information in said horizontal transfer unit; and an optical system for leading an incident light to an image taking area of said solid-state image sensing apparatus.

4. A camera according to claim 3, wherein said camera has a frame read-out operating mode and a line reducing operating mode.

* * * * *